United States Patent [19]
Flood

[11] Patent Number: 5,997,166
[45] Date of Patent: Dec. 7, 1999

[54] REDUNDANT INDUSTRIAL CONTROLLER STORING MODULE AND CHASSIS LEVEL REDUNDANCY STATUS

[75] Inventor: Mark A. Flood, Mayfield Heights, Ohio

[73] Assignee: Allen-Bradley Company, LLC, Milwaukee, Wis.

[21] Appl. No.: 08/878,175

[22] Filed: Jun. 18, 1997

[51] Int. Cl.[6] .................................................. G05B 15/00
[52] U.S. Cl. ........................ 364/131; 364/132; 364/134; 364/186; 364/187; 714/2; 714/6; 714/15
[58] Field of Search ................... 364/131, 187, 364/184; 395/182.04, 182.11, 182.19; 714/2, 6, 13, 15

[56] References Cited

U.S. PATENT DOCUMENTS

| | | | |
|---|---|---|---|
| 4,521,871 | 6/1985 | Galdum et al. | 364/187 |
| 4,535,453 | 8/1985 | Rhodes et al. | 370/110.1 |
| 4,672,529 | 6/1987 | Kupersmit | 364/130 |
| 4,858,101 | 8/1989 | Stewart et al. | 364/131 |
| 5,274,767 | 12/1993 | Maskovyak | 395/395 |
| 5,291,190 | 3/1994 | Scarola et al. | 364/138 |
| 5,313,386 | 5/1994 | Cook et al. | 364/187 |
| 5,392,424 | 2/1995 | Cook | 395/575 |
| 5,768,119 | 6/1998 | Havekost et al. | 364/187 |
| 5,777,874 | 7/1998 | Flood et al. | 364/187 |

Primary Examiner—Paul P. Gordon
Assistant Examiner—Ramesh Patel
Attorney, Agent, or Firm—John Miller; John Horn; Keith Baxter

[57] ABSTRACT

A redundant controller employs two controller chassis having replaceable functional modules interconnected electrically within the chassis. System back up modules in the chassis coordinate the switching of control from a primary to a secondary chassis according to chassis redundancy state information of the chassis stored in the backup modules and module redundancy state information stored in the modules unique to the modules.

5 Claims, 3 Drawing Sheets

REDUNDANT INDUSTRIAL CONTROLLER STORING MODULE AND CHASSIS LEVEL REDUNDANCY STATUS

BACKGROUND OF THE INVENTION

The present invention relates to industrial controllers and in particular to an industrial controller system having two chassis, one operating as an active controller and one operating as a back-up controller.

Industrial controllers are special purpose computers used for controlling factory automation and the like. Under the direction of a stored program, a processor of the industrial controller examines a series of inputs reflecting the status of a controlled process and changes outputs effecting control of the controlled process.

Typically, an industrial controller is constructed in a modular fashion, having one or more functional modules connected together through a common backplane in a chassis or the like. The modular construction allows the circuitry of the industrial controller to be customized to some degree for each application and simplifies maintenance and repair of the industrial controller in the event that one or more modules fail.

Industrial controllers must provide uninterrupted and reliable operation for long periods of time. One method of ensuring such operation is by providing a second controller chassis operating in a back-up mode to a primary or active controller chassis. If the active chassis should fail, the back-up chassis may take over the controlled process or equipment with minimal interruption. The back-up chassis may also be used to facilitate maintenance or testing of the control program. Such modifications may be performed on one chassis (either the active or back-up chassis) reverting to the other chassis if problems develop. In such circumstances, it is desirable that the two chassis be completely symmetric with either one having the capability of assuming an active or back-up capacity.

Each chassis in a redundant controller system must keep track of its redundancy status as a primary or secondary chassis so as to prevent conflicting control signals from being received by the controlled process from two chassis. For this reason it is desirable that each chassis have access to redundancy status information indicating whether it has a partner chassis and whether that partner is a primary or secondary chassis, and if a secondary chassis, whether it is 'qualified', that is, ready to assume control.

Qualification requires that the chassis have a full complement of functional modules (at least all the functional modules of the primary chassis) and the chassis have an up-to-date copy of the control program and the current data used by that control program. Qualification also requires that the two chassis are synchronized to the same point of execution in the control program. Generally, it is acceptable for the primary chassis to cede control to the secondary chassis only when that chassis is qualified. The status information for each chassis may be contained in a specialized backup module associated with each chassis which coordinates a switching over of control between chassis.

BRIEF SUMMARY OF THE INVENTION

The actions of each chassis, in providing redundancy, depend on the redundancy status of the chassis. The present inventors have recognized that, particularly in a modular controller, the actions of a chassis in providing redundancy may depend on the particular configuration of its functional modules and their relationship to the functional modules of a partner chassis, if any.

Accordingly, the present invention provides an industrial controller in which each chassis preserves its redundancy status as a chassis and wherein each functional module independently holds a module redundancy status similar to, but not necessarily identical to, that of its chassis. Actions of the chassis in providing redundant control may thus be based on both the status of the chassis and the status of its functional modules.

Specifically, the invention is an industrial controller providing redundant control of a process and having a first and second chassis with electrically interconnected slots sized to receive ones of interchangeable functional modules. A backup module is also included in each of the chassis having a processor and a state memory, the state memory holding a redundancy state of the chassis indicating its relationship to an other chassis in providing redundant control of the process. The controller also includes a plurality of functional modules having slot connectors releasable connecting the functional modules to a slot of the chassis. The functional modules also have a processor and a state memory, the state memory holding a redundancy state of the functional module indicating its relationship to a functional module in the other chassis in providing redundant control of the process. Stored programs executed by the processors of the backup modules and the functional modules control the operation of the chassis in providing redundant control of the process based on both the redundancy state of the chassis and the redundancy state of the chassis' functional modules.

Thus it is one object of the invention to provide a flexible redundant control system that may accommodate a chassis with many different types of functional modules and even two chassis with different functional modules. Because the redundancy states of the modules need not conform to those of their chassis greater flexibility in providing redundant control is possible.

The redundancy state of the chassis, for example, may indicate that the chassis is a secondary chassis, not currently providing output signals to the process and disqualified to serve as a backup chassis to the primary chassis. In contrast, the functional modules while also being disqualified, may provide additional redundancy status information whether they have corresponding partners in the primary chassis. In this way only the modules with partners need be qualified.

Thus it is another object of the invention to provide additional levels of redundancy state information specific to the modules thus streamlining redundancy operations such as qualification.

Alternatively, in a qualified secondary chassis, not currently providing output signals to the process but qualified to serve as a backup chassis to the primary chassis, some of the functional modules may be disqualified but have no partner in the primary chassis. In this case, the stored program of the backup modules and functional modules controls the operation of the chassis to assume primary control of the process if necessary, only using the modules having partners.

Thus, it is an object of the invention to permit the redundancy status of the modules to deviate from the redundancy status of their chassis which such deviation would not affect redundancy operations. A chassis may thus be qualified even though some of its modules are disqualified if those modules have no counterpart in the primary chassis. This state may be useful if the secondary chassis is being upgraded.

The state of the chassis may indicate that the chassis is a standby secondary chassis, not currently providing output signals to the process, but capable of serving as an intentionally non-identical backup chassis to a primary chassis. The standby state may be used when it is desired to upgrade or test one chassis and therefore the chassis may deviate significantly from the other. In this case, some of the modules may indicate that they have partners and some may indicate that they have no partner in the primary chassis. The stored programs of the backup modules and the functional modules may control the operation of the chassis to cause all modules in the standby chassis to begin execution, but to indicate to the user those modules not having a partner in the previously primary chassis so that a corrective action may be taken if desired.

Thus it is another object of the invention to permit the creation of a standby redundancy status where modules in one chassis may acceptably have no corresponding partners.

The redundancy state of the chassis may alternatively indicate that the chassis is a primary chassis providing current output signals to the process and having functional modules having a primary redundancy status with and without corresponding modules in the secondary chassis. The stored program of the backup module and the functional module may control the operation of the chassis to update only functional modules in the secondary chassis having partners in the primary chassis, for potentially assuming control.

Thus it is another object of the invention to use independently determined redundancy status for the modules to allow selected qualification of modules in the secondary chassis only when required.

The foregoing and other objects and advantages of the invention will appear from the following description. In this description reference is made to the accompanying drawings which form a part hereof and in which there is shown by way of illustration a preferred embodiment of the invention. Such embodiment does not necessarily represent the full scope of the invention, however, and reference must be made therefore to the claims for interpreting the scope of the invention.

DETAILED DESCRIPTION OF THE INVENTION

Controller Hardware

Figure 1:
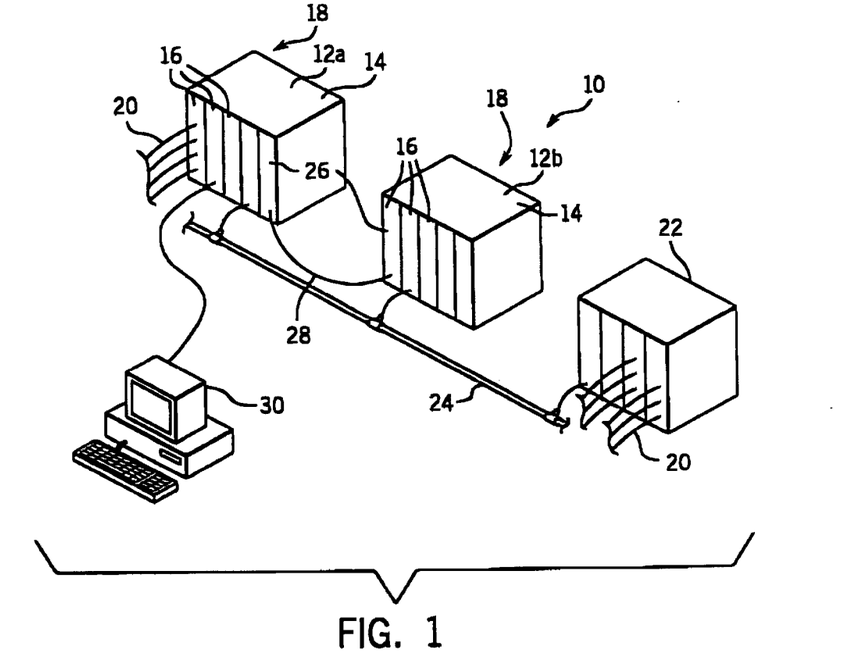
FIG. 1 is a simplified perspective view of an industrial controller having a primary and secondary chassis, each composed of functional modules, one of which is a back-up module, connected by a backplane and contained in separate racks.

Referring now to FIG. 1, an industrial control system 10 of the present invention includes a primary chassis 12a and a secondary chassis 12b housed in separate racks 14. Each of the racks 14 include multiple functional modules 16 electrically communicating via a backplane 18 comprised of multiple conductors running along the back of the racks 14.

Included among the functional modules 16 may be a communication module permitting communication between the chassis 12a and chassis 12b, as well as the remote I/O rack 22 along common high-speed link 24. The remote I/O rack 22 includes multiple I/O modules communicating with the controlled process also through lines 20. Chassis 12a and chassis 12b may also be connected via the same or a separate communication channel to a programming terminal 30 being of a conventional desktop computer design.

The chassis 12a and 12b also each include a system back-up module 26 coordinating back-up operation between the primary chassis 12a and secondary chassis 12b. The system back-up modules 26 communicate via a special-purpose, inter-chassis data link 28.

The I/O modules, communication modules and I/O rack operate generally according to a connected messaging protocol. In connected messaging, a particular control module of the industrial controller must "open" a connection with another control module of the industrial controller prior to sending or receiving data. This process of opening a connection reserves communication link resources for use by the control modules to ensure that the data transfer will not be delayed or obstructed. Two important link resources reserved by the opening of a connection are buffer space in the respective control modules to hold the transmitted data at the rate expected and a scheduled slot in the communication link bandwidth.

In a typical opening of a connection, a first control module will send an OPEN request to a second control module indicating the needed link resources. The second control module will then reply confirming the availability of link resources for the opened connection and providing a unique connection identification number "CID". When data is transmitted on the connection, the CID accompanies each packet of data and provides a means for connecting the packets and for rapidly routing the packets to their reserved buffers. The CID also permits an efficient scheduling of the packet in a queue for forwarding it through other nodes to its final destination.

Figure 2:
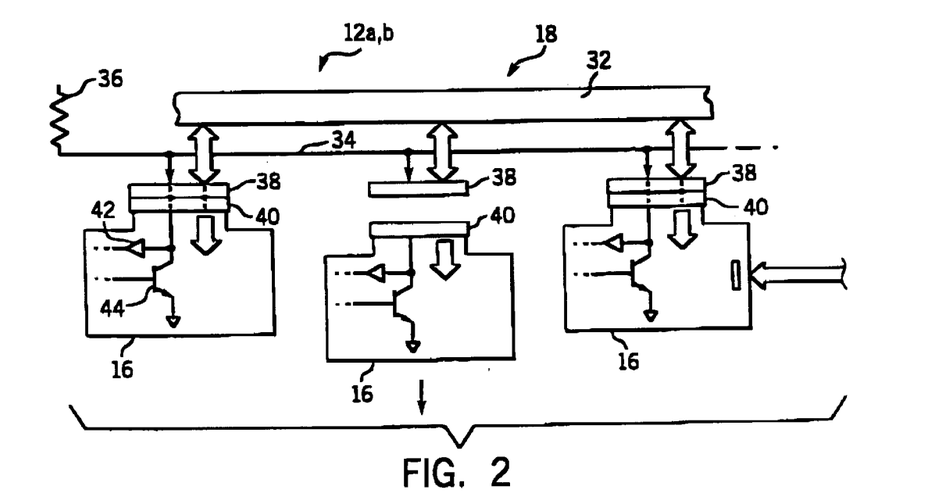
FIG. 2 is a block diagram of the functional modules of the primary chassis of FIG. 1 showing connection of the functional modules to the backplane including a fault status line and the removal of one functional module.

Referring now to FIGS. 1 and 2, the backplane 18 includes a parallel bus 32 for high-speed connected messaging between the functional modules 16. The backplane 18 also includes a system failure line 34 which is pulled to a high state in the absence of failure by a pull-up resistor 36.

Spaced along the backplane 18 within the racks 14 are multi-pin connector halves 38 receiving corresponding connector halves 40 attached to the functional modules 16. When a functional module 16 is connected to the backplane 18, the multi-channel bus 32 and the system failure line 34 are electrically connected to the electronics on the functional modules 16 for the exchange of information.

On each functional module 16, the system failure line 34 is received by a card input 42 so that the functional modules 16 may monitor the status of the system failure line 34. On each functional module 16, the system failure line 34 is also connected into a pull-down transistor 44 for asserting the system failure line by pulling it to a low voltage.

As will be understood from this description, the system failure line 34 provides an effective logical OR of failure signals from the individual functional modules 16. Thus, the system failure line 34 signals a failure of at least one functional module 16, but does not distinguish which modules 16 have failed, or how many modules 16 have failed.

Figure 3:
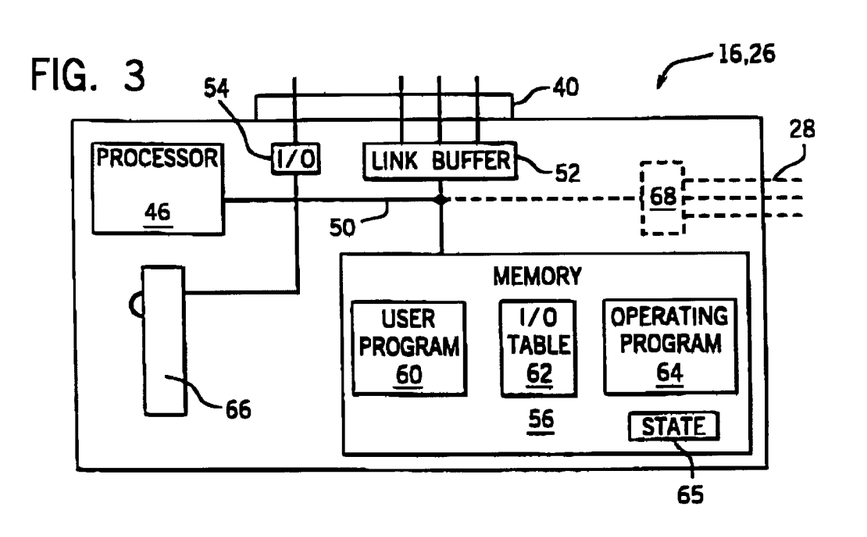
FIG. 3 is a block diagram of a functional module of FIG. 2 showing the allocation of memory to a control program, I/O data, state flags and an operating system.

Referring now to FIG. 3, a typical functional module 16 will include a processor 46 connected via an internal bus 50 to a link buffer 52 communicating with the connector 40 and ultimately with the backplane 18. The bus 50 may also communicate with the card input 42 and pull-down transistor 44 (described above and shown in FIG. 2) collected as I/O 54 in FIG. 3. Bus 50 may also connect to various front panel displays 66 including status lights and the like.

Like other functional modules 16, the system back-up modules include the connector 40 to connect them to the bus 32 and to the system failure line 34. In addition, the system back-up modules 26 include a special buffer 68 communicating with the inter-chassis data link 28 described above. This link allows the system back-up modules 26 to coordinate activities between the primary and secondary chassis in providing back-up for one another without need for or interference with the link 24 (which is independently susceptible to failure).

In all modules, an electronic memory 56, including volatile and non-volatile memory components well understood in the art, is also connected to bus 50 to communicate with the processor 46. Memory 56 holds a user program 60 written to control the particular industrial application at hand. An I/O table 62, of a type understood in the art, is also contained in memory 56 and stores the input and output values exchanged with the controlled process over lines 20, either directly by the functional module 16 or via other functional modules as transferred through the link 24 or the backplane 18.

Generally, as is understood in the art, the I/O table 62 is asynchronously updated by special purpose hardware, and the processor 46 accesses the I/O table 62 as updated in the manner of conventional memory. Specifically, the connection identification numbers, CID, referred to above, for messages received by the primary chassis 12a, are forwarded to the secondary chassis 12b so that the latter may 'listen in' on messages and thus maintain current I/O table 62 and so that in the event of a switchover of control between the primary chassis 12a and the secondary chassis 12b, the same connections may be used, speeding up the switch over process.

An operating program 64 is also contained in memory 56 to provide a number of features related to the present invention as will be described.

The system back-up module 26 is similar to the other functional modules 16, however, in the system back-up modules, the memory 56 does not store the user program 60 or the I/O table 62. In addition, the system back-up modules 26, storing a different operating program 64, operate to coordinate back-up activities as will be described.

Also included in memory 56 are state data 65 recording the redundancy status of the module 16 generally, and in the system back-up modules 26, indicating the redundancy status of the particular chassis 12a or 12b. The status recorded is generally whether the particular module 16 or chassis 12 is providing primary or secondary control, and if secondary control, whether it is in a standby, disqualified or qualified mode, as will be described below. The state data 65 also indicates whether auto-qualification shall be performed as will be described. The state data 65 in memory 56 may be set by user command or by execution of the operating program 64 as will be described.

Qualification

During normal operation of the chassis 12a and 12b, first chassis 12a will act as a primary chassis actively controlling an industrial process in the manner of a conventional industrial controller. In order that the second chassis 12b be prepared to undertake control of that process if chassis 12a is incapacitated, it is necessary that chassis 12b have the same user program 60 and I/O table 62 as that present in primary chassis 12a.

This coordination of the chassis 12a and 12b is provided by a process termed "qualification" in which there is a cross-loading of the memories 56 of the first chassis 12a and the second chassis 12b. Qualification is followed by a constant updating of the I/O tables as they change (synchronism).

Periodically, auto-qualification (if enabled) will occur if there is an indication that the 'coherence' between the primary chassis 12a and secondary chassis 12b has been lost. Coherence indicates that the program 60 in the primary chassis 12a and secondary chassis 12b are identical, and that the hardware configurations as reflected in the functional module 16 are compatible. Events indicating a lack of coherence, detected by either system back-up module 26, will trigger an auto-qualification of the then secondary chassis. Such events include start up of the industrial controller, removal or replacement of functional modules 16.

More specifically, two autoqualification flags are stored in the state data 65 of memory 56. The first is user setable and has three possible values: Never Autoqualify, Always Autoqualify, and Conditionally Autoqualify. The second flag (termed the state flag) holds the current state of autoqualification: enabled or disabled. The state flag is set to enabled when the user selects Always Autoqualify and set to disabled when the user selects Never Autoqualify. When the user selects Conditionally Autoqualify, the state is left unchanged but will change when any of the following occur:

TABLE I

| Occurrence | Effect on Flag |
| --- | --- |
| Qualification command received | Enabled |
| Disqualify Secondary command received | Disabled |
| Enter Standby command received | Disabled |
| Swap to Standby Command received | Disabled |

Qualification is performed under the operating systems of the system back-up modules 26 and includes three stages. In a first stage, it is verified through the system back-up modules 26a and 26b, that each functional module 16 in the primary chassis 12a has a corresponding module 16 with similar configuration in the secondary chassis 12b. In the second stage, the memory 56 of each module 16 of the primary chassis 12a is cross-loaded to the memory of the secondary chassis 12b. This cross loading includes the user program 60 and the I/O table 62. In the third stage, changes to the configuration flags and programs 60 which have been locked out in stage one are released. After qualification is successfully completed, the system back-up modules 26a and 26b check to see if a switch-over should occur.

The qualified and disqualified modes are determined by whether the chassis 12 have coherence. Generally a qualified secondary chassis 12b has had the qualification process completed and is ready to assume control if a switch-over signal is received from the system back-up module 26. Similarly, a disqualified secondary chassis 12b has not been qualified or has failed qualification and is not ready to assume control of the controlled process and will refuse such control. In the standby state, the secondary chassis 12b has been qualified once and is now locked against further qualification regardless of changes in the primary chassis. The purpose of this standby state is to provide a known stable environment that may be returned to when upgrades being tested on the other chassis are unsuccessful. A secondary chassis 12b in standby mode will assume control even though it is not necessarily coherent as described above with the primary chassis 12a.

Figure 4:
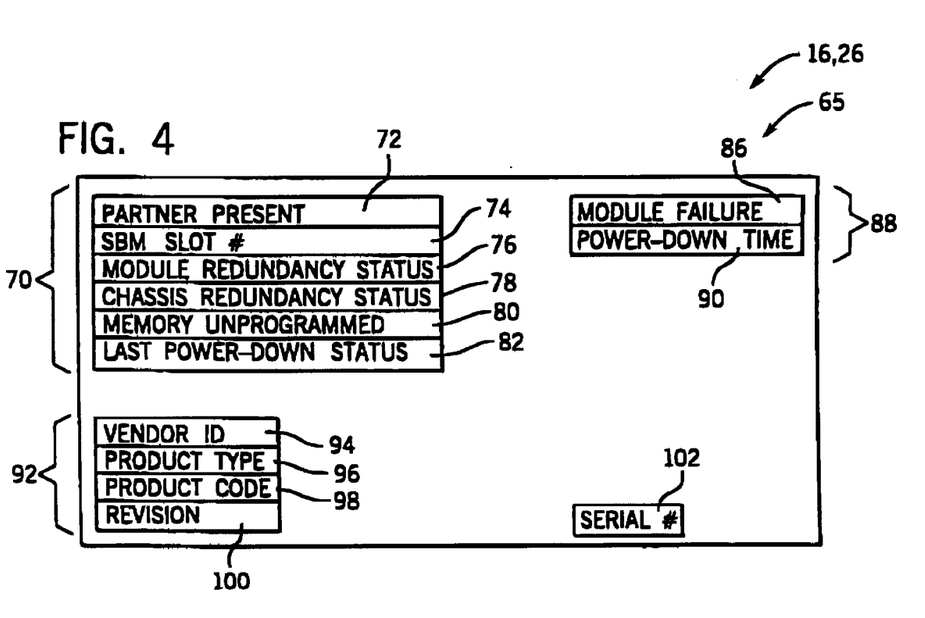
FIG. 4 is a detailed representation of the state flags of FIG. 3 showing redundancy status data for the chassis and the functional modules.

Referring now to FIG. 4, the state data 65 of FIG. 3 include a variety of attributes defining the operation of the modules 16. Part of a redundancy object 70, the state data 65 include a first data value 72 indicating whether the particular module 16 in one chassis 12 has a corresponding module 16 in the other chassis 12 that supports redundancy. No indications are given as to whether the particular module is of the same type, however.

A second data value 74 provides a slot number or physical address of the system back-up module 26. This value is initially set to a high value and is reset to the physical address of the system back-up module 26 for the chassis 12 in which that module 16 is resident, as part of the system back-up module's power-up sequence. The modules 16 will reject a value written to this data value 74 that is larger than the current value to ensure that, if there are multiple system back-up modules 26 in a rack, the system back-up module 26 with the lowest physical address will control the system.

A third data value 76 in the redundancy object 70 indicates whether the module 16 is currently operating as a primary or secondary status. Generally, the module has a similar status as the chassis 12a or 12b as is updated by the system back-up module 26 as will be described. The choices for status are as follows:

TABLE II

| Data Value | Status Meaning |
| --- | --- |
| 1 | Power up/undetermined |
| 2 | Primary with qualified secondary |
| 3 | Primary with disqualified secondary |
| 4 | Primary with no secondary |
| 5 | Primary with standby secondary |
| 6 | Primary with qualifying secondary |
| 7 | Qualifying secondary |
| 8 | Qualified secondary |
| 9 | Disqualified secondary with primary partner |
| 10 | Disqualified secondary with no partner |
| 11 | Standby secondary with compatible partner |
| 12 | Standby secondary without compatible partner |

Similarly, a fourth data value 78 provides the status (as primary and secondary) of the chassis 12 as a whole as follows.

TABLE III

| Data Value | Status Meaning |
| --- | --- |
| 1 | Power up/undetermined |
| 2 | Primary with qualified secondary |
| 3 | Primary with disqualified secondary |
| 4 | Primary with no secondary |
| 5 | Primary with standby secondary |
| 6 | Primary with qualifying secondary |
| 7 | Qualifying secondary |
| 8 | Qualified secondary |
| 9 | Disqualified secondary with primary partner |
| 10 | Disqualified secondary with no partner |
| 11 | Standby secondary |

Fifth data value 80 indicates whether the memory in a processor module 16, that would normally hold the user program 60, is blank or unprogrammed.

Sixth data value 82 indicates the status of the module 16 when power was last removed, generally as indicated in Table III above. Sixth data value 82 differs from third data value 76 in that for a module just receiving power, the third data value will be undetermined, whereas its last power-down status normally will be determined.

The system back-up module 26 will also have access to data via polling, represented as data value 86 indicating whether any of the modules 16 in the chassis 12 of that system back-up module 26 has exerted the system failure line 34. The system back-up object 88 will also include a second data value 90 indicating the time at which the last power-down occurred according to a coordinated clock shared between the modules and the chassis 12.

A device object 92 also exists within each module 16 intended to provide information on the type and characteristics of the module 16. Generally, the device object 92 includes a first data value 94 giving a vendor identification number, a second data value 96 providing a product type number designated by the manufacturer, a third data value 98 being a product code also designated by a manufacturer, and a fourth data value 100 being a revision number typically indicating a change in firmware rather than a change in the hardware of the module.

A serial number 102 is also included in the state data 65 of the system back-up module 26 and for the rack itself.

Each of the above described data values is accessible by the system back-up module 26 of a particular chassis 12 and to the system back-up module of the opposing chassis by the interchassis data link 28. Thus, the system back-up modules 26 of each chassis 12 may read the objects and data of FIG. 4 for all the modules 16 of its own and the other chassis 12.

Generally, the status of the modules includes an additional state providing for standby secondary status with and without compatible partners. The fourth data value providing the status of the chassis 12 as a whole is used to guide the providing of redundant control by the chassis 12. Generally, the chassis having primary status provides outputs to the control process while the chassis having secondary status does not provide output so as to prevent a conflict. The secondary chassis maintains synchronization with the primary chassis by monitoring inputs received by the primary chassis 12 and receiving from the primary chassis 12 synchronization information so as to be updated as to the point of the control program being executed at any given time.

Effect Of Redundancy Status Of Operation

Upon the occurrence of a switchover event, either a failure of the primary chassis or one of its modules, or an instruction to perform the switchover, the primary chassis becomes a secondary chassis and the secondary chassis if qualified becomes the primary chassis. The actions of the chassis 12 in providing redundant control are orchestrated by the system back-up modules.

Where a fault occurs in a primary chassis without qualified secondary, the primary will log the fault, execute a user fault routine (if the user supplied one) and if the fault routine clears the fault, the primary chassis continues execution. If the fault routine does not clear the fault, or if no fault routine exists, the primary enters the fault mode, ceases execution and drives its outputs to a predefined fault state.

A disqualified secondary chassis prior to switchover attempts qualification by matching its modules to the modules of the primary chassis and synchronizing those modules to match their programming and data. A standby state is also provided in which the secondary module will accept a switchover of control from the primary module even though the secondary module is not completely qualified in that its' hardware or software does not match that of the primary chassis. The standby secondary chassis must nevertheless have access to the same data operated on by the primary chassis. Through a crossloading of I/O data tables or monitoring of inputs received by the primary chassis during its operation.

As discussed above, the third data value 76 indicating the redundancy status of the functional modules need not be the same as the fourth data value 78 indicating the redundancy status of the chassis. As indicated in the following Table IV, multiple module states are allowed for a given primary chassis state.

secondary chassis state while allowing modules that are disqualified secondary modules with no partner to remain unqualified. Efficient qualification is thus provided.

A qualified secondary chassis may have modules that are qualified with partners or disqualified with no partners. Here the intent is to recognize that a secondary chassis may serve a backup capacity even if it has additional modules not used in the primary chassis. Upon occurrence of a switchover, these modules without partners are disabled.

A primary chassis having a standby secondary partner may have modules that are primary with no partner or primary with standby secondary partners. Here the additional redundancy states permitted to the modules allows a discrepancy in hardware between the primary and standby

TABLE IV

| MODULE STATES | CHASSIS STATES | | | | | | | |
|---|---|---|---|---|---|---|---|---|
| | Primary Chassis with Qualified Secondary Partner | Primary Chassis with Disqualified Secondary Partner | Primary Chassis with no Partner | Primary Chassis with Standby Secondary Partner | Qualified Secondary Chassis | Disqualified Secondary Chassis with Primary Partner | Disqualified Secondary Chassis with No Partner | Standby Secondary Chassis |
| Non-Redundancy Compliant | Not Allowed | Allowed | Allowed | Not Allowed | Not Allowed | Not Allowed | Not Allowed | Not Allowed |
| Primary with Qualified Secondary Partner | Allowed | Not Allowed | Not Allowed | Not Allowed | Not Allowed | Not Allowed | Not Allowed | Not Allowed |
| Primary with Disqualified Secondary Partner | Not Allowed | Allowed | Not Allowed | Not Allowed | Not Allowed | Not Allowed | Not Allowed | Not Allowed |
| Primary with no Partner | Not Allowed | Allowed | Allowed | Allowed | Not Allowed | Not Allowed | Not Allowed | Not Allowed |
| Primary with Standby Secondary Partner | Not Allowed | Not Allowed | Not Allowed | Allowed | Not Allowed | Not Allowed | Not Allowed | Not Allowed |
| Qualified Secondary | Not Allowed | Not Allowed | Not Allowed | Not Allowed | Allowed | Not Allowed | Not Allowed | Not Allowed |
| Disqualified Secondary with Primary Partner | Not Allowed | Not Allowed | Not Allowed | Not Allowed | Not Allowed | Allowed | Not Allowed | Not Allowed |
| Disqualified Secondary with no Partner | Not Allowed | Not Allowed | Not Allowed | Not Allowed | Allowed | Allowed | Allowed | Not Allowed |
| Standby Secondary with Compatible Partner | Not Allowed | Not Allowed | Not Allowed | Not Allowed | Not Allowed | Not Allowed | Not Allowed | Allowed |
| Standby Secondary without Compatible Partner | Not Allowed | Not Allowed | Not Allowed | Not Allowed | Not Allowed | Not Allowed | Not Allowed | Allowed |

Referring to Table IV, for example, a standby secondary chassis may permit modules that both have compatible partners or do not have compatible partners. This feature allows for the updating of a secondary chassis with new hardware and then a switching to the secondary chassis with a switchover event. Upon the switchover, all modules begin control operations, but the modules without partners provide notification to the user so that corrective action may be taken if the operation of all modules are not desired.

Likewise, a disqualified secondary chassis may include disqualified secondary modules either having or without primary partner. Qualification of only those modules with partners can efficiently move the chassis to a qualified chassis which as described before, allows for upgrading of hardware on one chassis in standby state by switching to the chassis and then upgrading of the previous primary chassis, now a standby chassis.

The primary chassis with disqualified secondary partner may also have primary modules with and without partners. Qualification will not occur if any module in the primary does not have a partner.

The control of the chassis in this regard is affected by the system backup modules 26 executing their operating systems 64 based on readings of the status table 65 and in particular the redundancy states as have been described. Similarly, the functional module 16 execute their internal operating systems 64 in view of the data in the table 65 to provide redundant control operation in parallel with their chassis.

Generally, therefore, the functional modules 16 within a chassis that is a primary chassis are primary functional modules providing outputs to the control process whereas functional modules within a secondary chassis are secondary functional modules not providing control outputs but serving in backup capacity.

Figure 5:
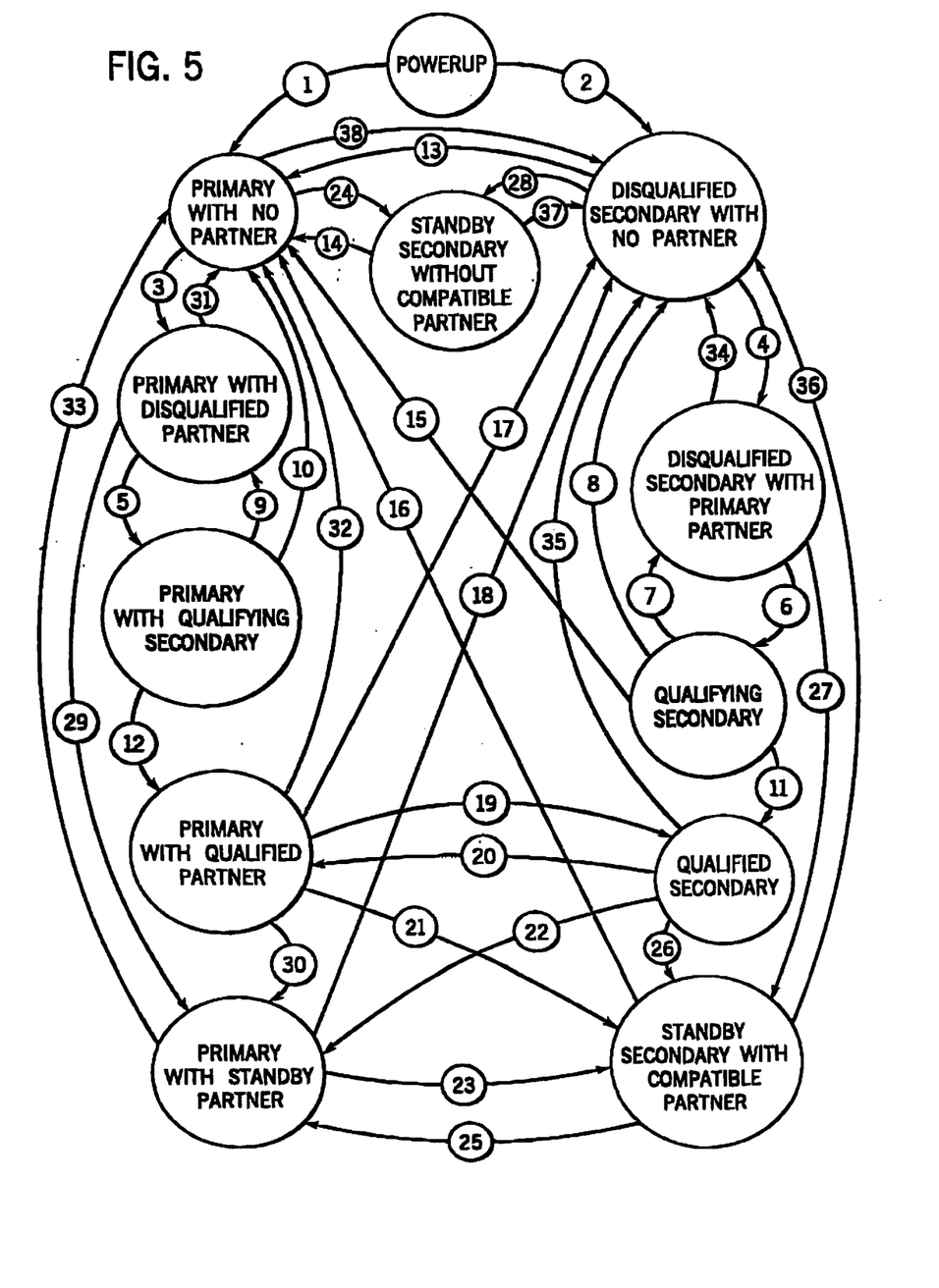
FIG. 5 is a state diagram showing the transitions between redundancy states of the functional modules of FIGS. 1 and 2 based on the redundancy status data for the functional module.

Referring to FIG. 5 the functional modules 16 move through their redundancy states provided of Table III above according to their operating system program 64 and redundancy controlling as summarized in Table V below.

components and hence, for example, the back-up functions of the back-up module need not be performed in a particular unit but may be spread out among units. In order to apprise the public of the various embodiments that may fall within the scope of the invention, the following claims are made.

I claim:

1. An industrial controller providing redundant control of a process, the controller comprising:
   (a) a first and second chassis having:
      (i) electrically interconnected slots sized to receive ones of interchangeable functional modules to provide redundant control capabilities;
      (ii) a back-up module having a processor and a state memory, the state memory holding a first redun-

TABLE 5

| Circled Transition Number | Cause Of Transition |
|---|---|
| 1 | Power up of module in a primary chassis or power up of module without redundancy capabilities |
| 2 | Power up of module in a secondary chassis |
| 3 | Establishment of a communication with another chassis or insertion of corresponding module in another chassis |
| 4 | Establishing communication with a primary chassis or insertion of corresponding module in a primary chassis |
| 5 | Qualification initiated |
| 6 | Qualification initiated |
| 7 | Qualification failure |
| 8 | Loss of communication with primary chassis or corresponding module |
| 9 | Qualification failure |
| 10 | Loss of communication with secondary chassis or removal of partner module |
| 11 | Qualification complete |
| 12 | Qualification complete |
| 13 | Become primary signal received or swap to standby signal received |
| 14 | Switchover signal received |
| 15 | Loss of system backup module detected in the primary; not a cable break |
| 16 | Loss of system backup module in the primary detected; not a cable break |
| 17 | Failure of the system backup module in the primary |
| 18 | Failure of the system backup module in the primary |
| 19 | Swap control signal received |
| 20 | Swap control signal received |
| 21 | Swap to standby signal received |
| 22 | Swap to standby signal received |
| 23 | Swap to standby signal received |
| 24 | Swap to standby command received |
| 25 | Swap to standby command received |
| 26 | Become standby command received |
| 27 | Become standby command received |
| 28 | Become standby command received |
| 29 | Become standby command received |
| 30 | Become standby command received |
| 31 | Loss of secondary partner |
| 32 | Loss of secondary partner |
| 33 | Loss of secondary partner |
| 34 | Loss of primary partner |
| 35 | Fault in secondary or loss of communication with primary or disqualified secondary command received |
| 36 | Fault in secondary or loss of communication with primary or disqualified secondary command received |
| 37 | Fault in secondary or loss of communication with primary or disqualified secondary command received |
| 38 | Duplicate primary chassis detected |

The above description has been that of a preferred embodiment of the present invention. It will occur to those that practice the art that many modifications may be made without departing from the spirit and scope of the invention. For example, in a computing system where components communicate freely with each other, particular hardware or operating programs may be distributed among different dancy state of the chassis indicating its relationship to an other of the first and second chassis in providing redundant control of the process, the processor executing a stored program;

(b) a plurality of functional modules each having:
   (i) a slot connector releasably connecting the functional module to a slot;

(ii) a processor and a state memory, the state memory holding a second redundancy state of the functional module independent of the first redundancy state indicating its relationship to a functional module in the other of the first and second chassis in providing redundant control of the process, the processor executing a stored program; and wherein the stored programs of the back up modules and the functional modules control the operation of the chassis in providing redundant control of the process based on both the redundancy state of the chassis and the redundancy state of each chassis's functional modules.

2. The industrial controller of claim 1 wherein the redundancy state of the chassis indicates that the chassis is a secondary chassis not currently providing output signals to the process and disqualified to serve as a back-up chassis to a primary chassis;

wherein the redundancy state of a first set of functional modules indicate that they are disqualified secondary modules not providing current output signals to the process and having a corresponding partner in a primary chassis;

wherein the redundancy state of a second set of functional modules indicate that they are disqualified secondary modules not providing current output signals to the process and not having a corresponding partner in a primary chassis; and wherein the stored programs of the back up modules and the functional modules control the operation of the chassis to prepare only the first set of functional modules for control of the process.

3. The industrial controller of claim 1 wherein the redundancy state of the chassis indicates that the chassis is a qualified secondary chassis not providing current output signals to the process and qualified to serve as a back-up chassis to a primary chassis;

wherein the redundancy state of a first set of functional modules indicate that they are qualified secondary modules not providing current output signals to the process and having a corresponding partner in a primary chassis;

wherein the redundancy state of a second set of functional modules indicate that they are disqualified secondary modules not providing current output signals to the process and not having a corresponding partner in a primary chassis; and wherein the stored programs of the back up modules and the functional modules control the operation of the chassis assume primary control of the process only using the first set of functional modules for control of the process.

4. The industrial controller of claim 1 wherein the redundancy state of the chassis indicates that the chassis is a standby secondary chassis not providing current output signals to the process and serving as a non-identical back-up chassis to a primary chassis;

wherein the redundancy state of a first set of functional modules indicate that they are standby secondary modules not providing current output signals to the process and having a corresponding partner in a primary chassis;

wherein the redundancy state of a second set of functional modules indicate that they are standby secondary modules not providing current output signals to the process and not having a corresponding partner in a primary chassis;

wherein the stored programs of the back up modules and the functional modules control the operation of the chassis to cause the second set of functional modules to assume control but indicate their lack of partner status to a user upon the chassis assuming primary control of the process.

5. The industrial controller of claim 1 wherein the redundancy state of the chassis indicates that the chassis is a primary chassis providing current output signals to the process and having an associated secondary chassis not qualified for providing back-up;

wherein the redundancy state of a first set of functional modules indicate that they are primary modules providing current output signals to the process and having a corresponding partner in a primary chassis;

wherein the redundancy state of a second set of functional modules indicate that they are primary modules not providing current output signals to the process and not having a corresponding partner in a primary chassis;

wherein the stored programs of the back up modules and the functional modules control the operation of the chassis to update only the partners of the first set of functional modules to assume primary control.

* * * * *